US011598070B2

(12) United States Patent
Roske

(10) Patent No.: US 11,598,070 B2
(45) Date of Patent: Mar. 7, 2023

(54) MECHANICAL DRIVE CONTROL FOR LOADERS

(71) Applicant: Clark Equipment Company, West Fargo, ND (US)

(72) Inventor: Craig Roske, Lincoln, ND (US)

(73) Assignee: Clark Equipment Company, West Fargo, ND (US)

( * ) Notice: Subject to any disclaimer, the term of this patent is extended or adjusted under 35 U.S.C. 154(b) by 791 days.

(21) Appl. No.: 15/957,203

(22) Filed: Apr. 19, 2018

(65) Prior Publication Data

US 2018/0305896 A1 Oct. 25, 2018

Related U.S. Application Data

(60) Provisional application No. 62/487,161, filed on Apr. 19, 2017.

(51) Int. Cl.
*E02F 9/22* (2006.01)
*F15B 11/17* (2006.01)
(Continued)

(52) U.S. Cl.
CPC .............. *E02F 9/225* (2013.01); *B62D 11/04* (2013.01); *E02F 3/3414* (2013.01); *E02F 9/02* (2013.01);
(Continued)

(58) Field of Classification Search
CPC ....... E02F 9/225; E02F 9/2004; E02F 9/2292; E02F 9/166; B62D 11/04; B62D 33/067; B62D 33/073; B60K 26/00
See application file for complete search history.

(56) References Cited

U.S. PATENT DOCUMENTS 3,579,986 A 5/1971 Matsudo-Shi et al.
3,599,741 A 8/1971 Langford
(Continued)

FOREIGN PATENT DOCUMENTS

CN 1185548 A 6/1998
CN 105339558 A 2/2016

OTHER PUBLICATIONS

International Search Report and Written Opinion dated Sep. 19, 2018 for International Publication No. PCT/US2018/028303 filed Apr. 19, 2018, 15 pages.
(Continued)

*Primary Examiner* — Jacob B Meyer
*Assistant Examiner* — Maurice L Williams
(74) *Attorney, Agent, or Firm* — John Veldhuis-Kroeze; Westman, Champlin & Koehler, P.A.

(57) ABSTRACT

Disclosed are power systems, and power machines employing the power systems, having dual in-line pumps configured to supply hydraulic fluid to respective left and right side travel motors of the power machine. In some exemplary embodiments, pump pintle arm controls and a single centering mechanism for the pintle arm controls are provided. The single centering mechanism is configured to center the pintle arms for each of the two pumps. Also in some exemplary embodiments, a mechanical control linkage configuration allows the separate pump pintle arm controls to be positioned on a side of the pump substantially one behind the other. This allows hydraulic connections to the pumps to be placed on top of the pump assembly, improving the routing of hydraulic hoses in the power machine.

9 Claims, 10 Drawing Sheets

(51) Int. Cl.

| | |
|---|---|
| ***E02F 9/20*** | (2006.01) |
| ***E02F 9/02*** | (2006.01) |
| ***E02F 9/16*** | (2006.01) |
| ***B62D 11/04*** | (2006.01) |
| ***E02F 3/34*** | (2006.01) |
| ***G05G 5/05*** | (2006.01) |

(52) U.S. Cl.

CPC ............ *E02F 9/166* (2013.01); *E02F 9/2004* (2013.01); *E02F 9/226* (2013.01); *E02F 9/2292* (2013.01); *F15B 11/17* (2013.01); *G05G 5/05* (2013.01); *F15B 2211/20576* (2013.01)

(56) References Cited

U.S. PATENT DOCUMENTS

| | | | | |
|---|---|---|---|---|
| 3,605,519 A | | 9/1971 | Heggen | |
| 3,765,500 A | | 10/1973 | Reeves | |
| 3,792,744 A | | 2/1974 | Gray | |
| 3,916,767 A | | 11/1975 | Barton | |
| 3,938,401 A | | 2/1976 | Bauer | |
| 3,968,706 A | | 7/1976 | Bauer | |
| 4,020,963 A | | 5/1977 | Carter | |
| 4,043,416 A | | 8/1977 | Albright et al. | |
| 4,057,122 A | | 11/1977 | Brownell et al. | |
| 4,064,766 A | | 12/1977 | Rinaldo | |
| 4,090,411 A | | 5/1978 | Albright et al. | |
| 4,156,474 A | * | 5/1979 | Aida ...................... | B60K 20/04 180/328 |
| 4,169,513 A | | 10/1979 | Sagaser et al. | |
| 4,206,826 A | * | 6/1980 | McMillen .............. | B60K 20/04 74/473.1 |
| 4,210,221 A | * | 7/1980 | McMillen .............. | B60K 20/04 180/328 |
| 4,269,282 A | * | 5/1981 | Meacock, II .......... | B60K 20/04 180/328 |
| 4,276,952 A | | 7/1981 | Kuhfuss, Jr. et al. | |
| 4,506,757 A | | 3/1985 | Matsumoto et al. | |
| 4,526,204 A | | 7/1985 | Primdahl | |
| 4,834,424 A | | 5/1989 | Link | |
| 5,378,127 A | | 1/1995 | Welscher | |
| 5,894,899 A | | 4/1999 | Ashcroft et al. | |
| 5,894,908 A | | 4/1999 | Eftefield | |
| 5,916,138 A | | 6/1999 | Hild et al. | |
| 6,128,971 A | | 10/2000 | Papasideris | |
| 6,389,922 B1 | | 5/2002 | Krieger | |
| 6,481,950 B1 | | 11/2002 | Stickney et al. | |
| 6,487,857 B1 | | 12/2002 | Poplawski et al. | |
| 6,523,635 B1 | * | 2/2003 | Johnston ................ | B62D 11/04 180/6.48 |
| 6,581,704 B2 | | 6/2003 | Law et al. | |
| 6,978,612 B2 | | 12/2005 | Smith et al. | |
| 7,051,641 B2 | | 5/2006 | Berg et al. | |
| 7,234,707 B2 | | 6/2007 | Green et al. | |
| 7,617,620 B2 | | 11/2009 | Fukudome et al. | |
| 7,721,828 B2 | | 5/2010 | Fornes et al. | |
| 7,757,806 B2 | | 7/2010 | Bower | |
| 7,849,941 B2 | | 12/2010 | Bares et al. | |
| 7,950,894 B2 | | 5/2011 | Rossi et al. | |
| 8,205,539 B2 | | 6/2012 | Kisse et al. | |
| 8,573,681 B2 | | 11/2013 | Yamato et al. | |
| 8,651,219 B2 | | 2/2014 | Yoshida et al. | |
| 8,807,263 B2 | | 8/2014 | Caillieret et al. | |
| 8,875,507 B2 | | 11/2014 | Nichols et al. | |
| 9,605,412 B2 | | 3/2017 | Ikegami et al. | |
| 10,189,512 B2 | * | 1/2019 | Dehnert ............... | B62D 33/067 |
| 2004/0084924 A1 | | 5/2004 | Albright et al. | |
| 2013/0115036 A1 | | 5/2013 | Yamato et al. | |
| 2015/0060165 A1 | | 3/2015 | Shin et al. | |
| 2016/0281331 A1 | | 9/2016 | Ikegami et al. | |

OTHER PUBLICATIONS

Invitation to Pay Additional Fees And, Where Applicable, Protest Fee dated Jul. 18, 2018 for International Application No. PCT/US2018/028303 filed Apr. 19, 2018, 7 pages.

Communication pursuant to Article 94(3) EPC for European patent application No. 18 723 166.7, dated May 25, 2021, 4 pages.

First Office Action, including search report, for Chinese Patent Application No. 201880026101.2, dated Jun. 10, 2021, 20 pages.

* cited by examiner 415
505B
505A
560
560
510B
515B
510A
405
420
410
424
524A
515A 415
505A
405
560
510B
510A
420
515B
524B
424
515A
524A

MECHANICAL DRIVE CONTROL FOR LOADERS

CROSS-REFERENCE TO RELATED APPLICATION

This application claims the benefit of U.S. Provisional Application No. 62/487,161, which was filed on Apr. 19, 2017.

BACKGROUND

This disclosure is directed toward power machines. More particularly, this disclosure is directed toward mechanical drive control for power machines. Power machines, for the purposes of this disclosure, include any type of machine that generates power for accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Some work vehicles and other power machines have dual hydraulic pumps which are controlled by mechanical drive controls, such as operator levers in a cab of the power machine, to provide hydraulic fluid to separate left and right side travel motors. The dual hydraulic pumps can be formed in-line with one another in a single pump assembly or package. Each of the dual pumps must be separately controllable by a corresponding left or right side drive control mechanism, and each pump must be configured to return to a centered position. In a dual in-line pump package, the mechanical drive control connections to the pump and the centering mechanisms must fit within a limited amount of space.

The discussion above is merely provided for general background information and is not intended to be used as an aid in determining the scope of the claimed subject matter.

SUMMARY

Disclosed embodiments include power machines and power systems for power machines having dual hydraulic pumps, in a single in-line pump assembly configuration, for supplying hydraulic fluid to respective left and right side travel motors. In exemplary embodiments, pump pintle arm controls and a single centering mechanism for the pintle arm controls are provided. The single centering mechanism is configured to center the pintle arms for each of the two pumps. Also disclosed are mechanical control linkage configurations allowing the separate pump pintle arm controls to be positioned on a side of the pump substantially one behind the other. This allows hydraulic connections to the pumps to be placed on top of the pump assembly, improving the routing of hydraulic hoses in the power machine.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used to describe illustrative embodiments and should not be regarded as limiting. Words such as "including," "comprising," and "having" and variations thereof as used herein are meant to encompass the items listed thereafter, equivalents thereof, as well as additional items.

Disclosed embodiments include power machines and power systems for power machines having dual hydraulic pumps, in a single in-line pump assembly configuration, for supplying hydraulic fluid to respective left and right side travel motors. In exemplary embodiments, pump pintle arm controls and a single centering mechanism for the pintle arm controls are provided. The single centering mechanism is configured to center the pintle arms for each of the two pumps. Also disclosed are mechanical control linkage configurations allowing the separate pump pintle arm controls to be positioned on a side of the pump substantially one behind the other. This allows hydraulic connections to the pumps to be placed on top of the pump assembly, improving the routing of hydraulic hoses in the power machine.

Figure 2:
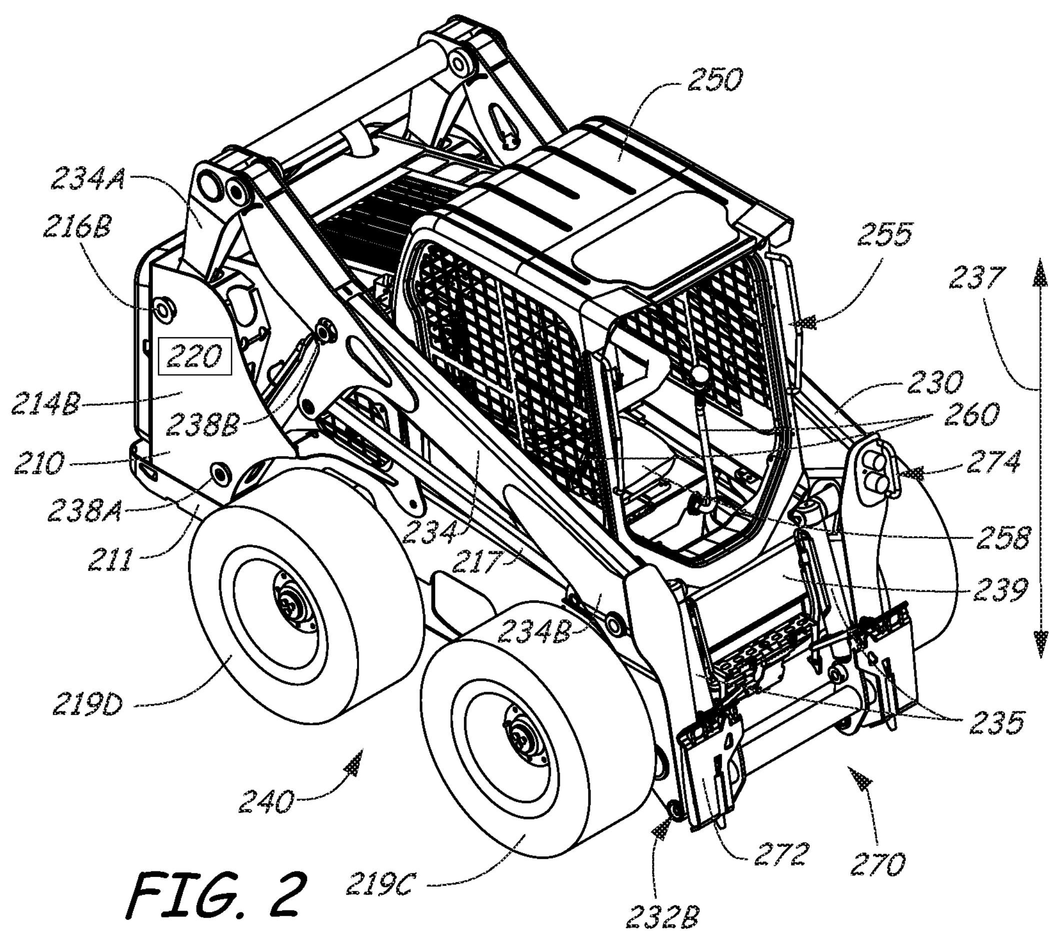
FIGS. 2-3 illustrate perspective views of a representative power machine in the form of a skid-steer loader of the type on which disclosed mechanical drive control embodiments can be practiced.
Figure 3:
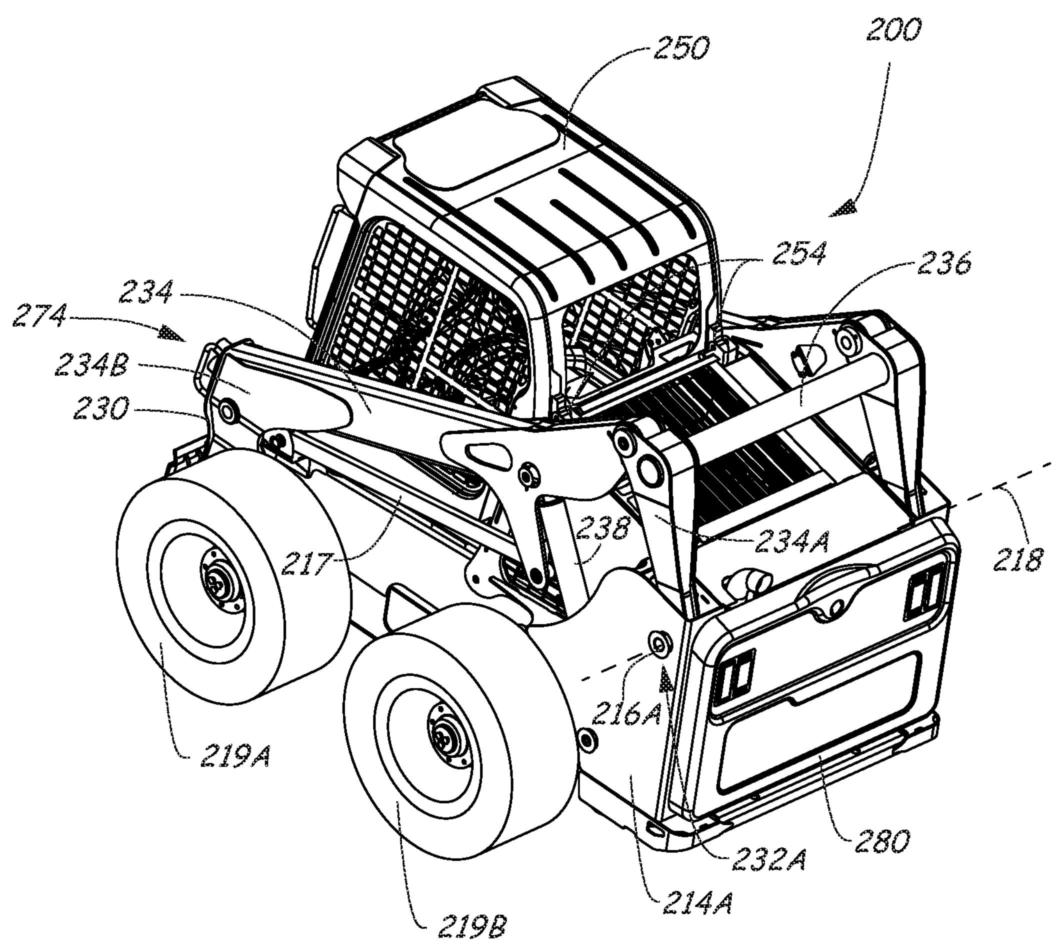

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3.

Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power. In exemplary embodiments, the motive system includes separately controllable left and right side travel motors, each supplied hydraulic fluid from a separate hydraulic pump of a dual in-line pump assembly, to power separate left and right side tractive elements. As discussed below in greater detail, in exemplary embodiments the power machines include mechanical drive control features and a centering mechanism configured to center the pintle arms of both pumps.

Figure 1:
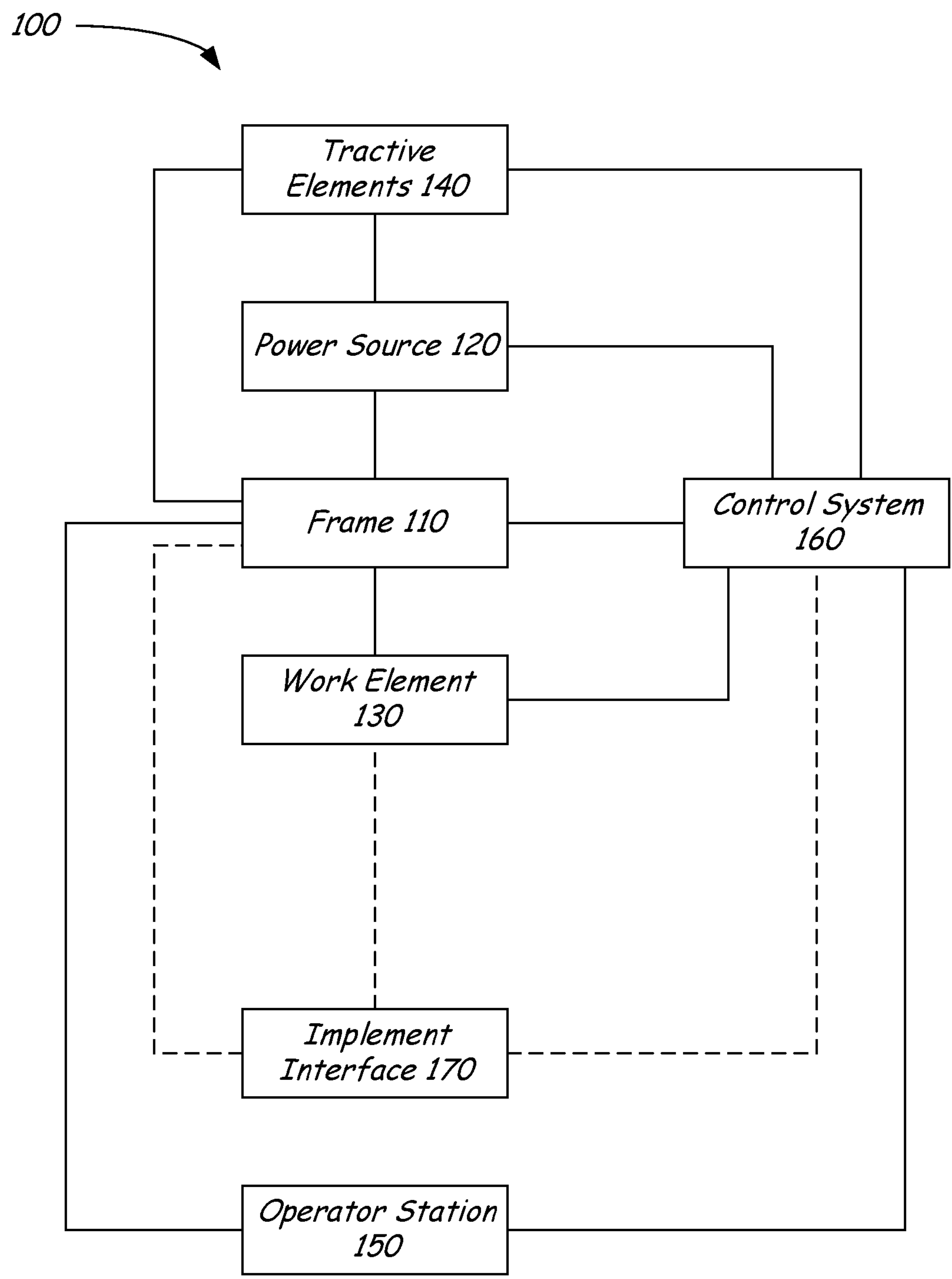
FIG. 1 is a block diagram illustrating functional systems of a representative power machine on which embodiments of the present disclosure can be advantageously practiced.

FIG. 1 is a block diagram that illustrates the basic systems of a power machine 100, which can be any of several different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion (so-called articulated frames) for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 has an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, even if they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator controlled functions on the power machine.

FIGS. 2-3 illustrate a loader 200, which is one example of the power machine 100 illustrated in FIG. 1 where the embodiments discussed below can be advantageously employed. As loader 200 is one example of the power machine 100, features of loader 200 described below include reference numbers that are generally similar to those used in FIG. 1. For example, loader 200 is described as having a frame 210, just as power machine 100 has a frame 110. Loader 200 is a skid-steer loader, which is a loader that has tractive elements (in this case, four wheels) that are mounted to the frame of the loader via rigid axles. Here the phrase “rigid axles” refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term “skid-steer” has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Skid-steer loader 200 is described herein to provide a reference for understanding one environment on which the embodiments described below, including mechanical drive controls and pump centering mechanisms, can be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that is capable of generating or otherwise providing power for operating various functions on the power machine. Power system 220 is shown in block diagram form, but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220, for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals, and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that include and/or interact with the embodiments discussed below can have various frame components that support various work elements. The elements of frame 210 discussed herein are provided for illustrative purposes and frame 210 is not necessarily the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the vertical path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

Implement interface 270 is located proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
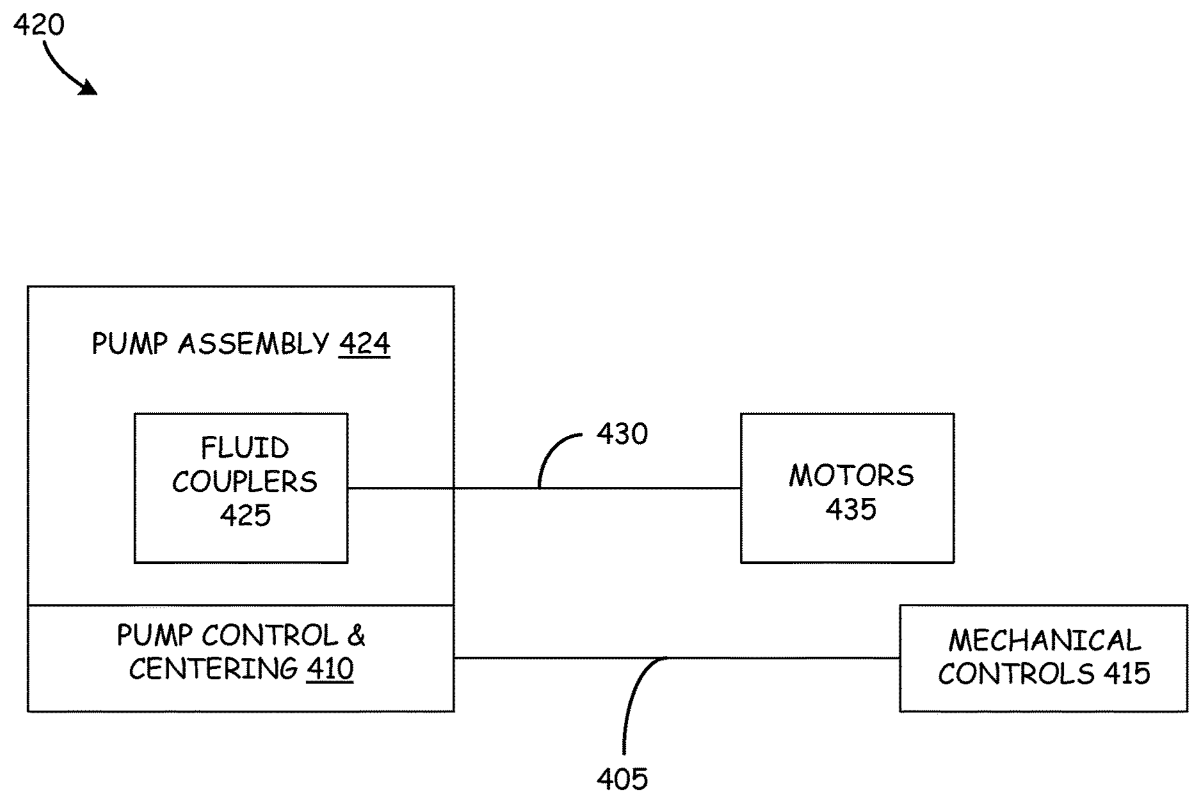
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as skid-steer loader 200, unless otherwise noted or recited, the concepts discussed below are not intended to be limited in their application to the environments specifically described above.

Disclosed embodiments of power machines, such as power machines 100 and 200 described above, have power conversion systems including some or all of the features described below. Referring to FIG. 4, shown in diagrammatic form is a power conversion system 420 which can be included in the disclosed power machines in exemplary embodiments. Power conversion system 420 includes a pump assembly or package 424 having dual in-line drive pumps 524A and 524B (shown in FIG. 5) which are each separately controlled to selectively supply hydraulic fluid through hydraulic conduits or hoses 430 to corresponding ones of left and right side travel motors, collectively shown as motors 435. Hydraulic hoses 430 couple to pumps 524A and 524B of pump assembly 424 at fluid couplers 425. In exemplary embodiments, fluid couplers 425 are positioned on a top of pump assembly 424, in other words, with the pump assembly 424 positioned between fluid couplers 425 and the ground or support surface on which the power machine will travel.

Pump assembly 424 also includes pump controls 410 positioned on the pump assembly and configured to control the amount and direction of hydraulic fluid flow from each of pumps 524A and 524B. For example, pump controls 410 can include pintle arms and associated mechanisms, coupled to mechanical controls 415 such as drive levers in the operator compartment, by mechanical linkages 405. Also, in exemplary embodiments, pump controls 410 include a centering mechanism configured to center the pintle arms of both of pumps 524A and 524B. Examples of the pump controls are discussed below in greater detail. Because the pump assembly is advantageously oriented within the power machine (as shown in FIGS. 5-8) so that fluid couplers are positioned on top of the pump assembly (thereby providing improved conduit routing within the power machine), the pump controls 410 are positioned on one side of the pump assembly in an exemplary embodiment.

Referring now to FIGS. 5-8, shown is a more detailed embodiment of power conversion system 420. As shown, power conversion system 420 includes an engine (not shown) that powers pump assembly 424. Pump assembly 424 includes a pair of drive pumps 524A and 524B that selectively provide pressurized hydraulic fluid to drive motors 435. Although not shown, pump assembly 424 can also include an implement pump, which is configured to provide hydraulic fluid to work devices such as lift arms and attachable implements. Power conversion system 420 also includes pump controls 410, which can control the provision of pressurized hydraulic fluid to the drive motors 435. Mechanical controls 415, including left hand steering lever 505A and right hand steering lever 505B are operable by a user to provide signals that indicate an intention to move the power machine. Linkages 405 operably couple the steering levers to pump controls 410 to transfer those signals to the drive pumps. Linkages 405 include left hand control link 510A and right hand control link 510B.

Figure 7:
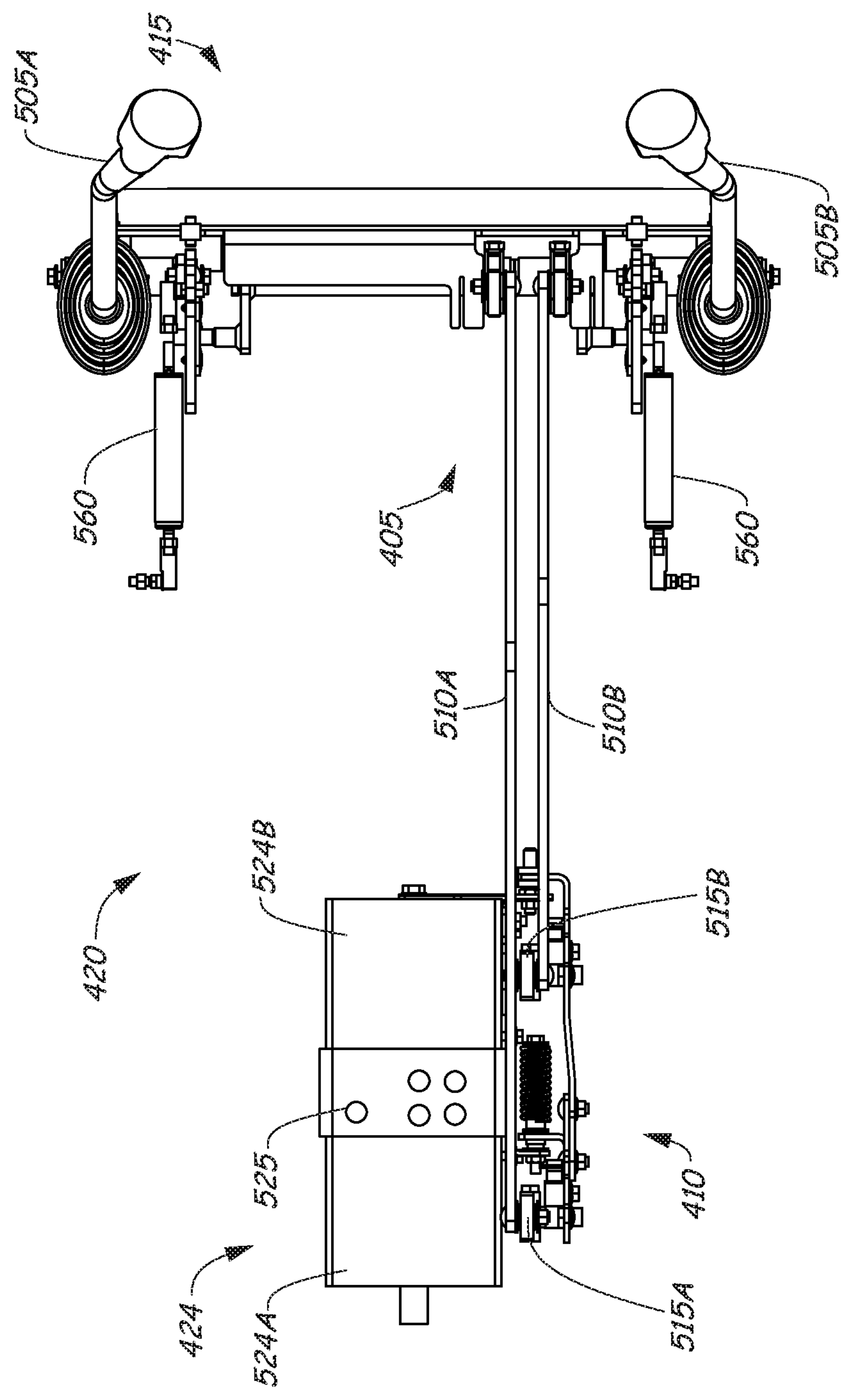
FIG. 7 is a top view of the pump assembly, pump controls and centering mechanisms, and corresponding mechanical controls shown in FIGS. 5-6.
Figure 8:
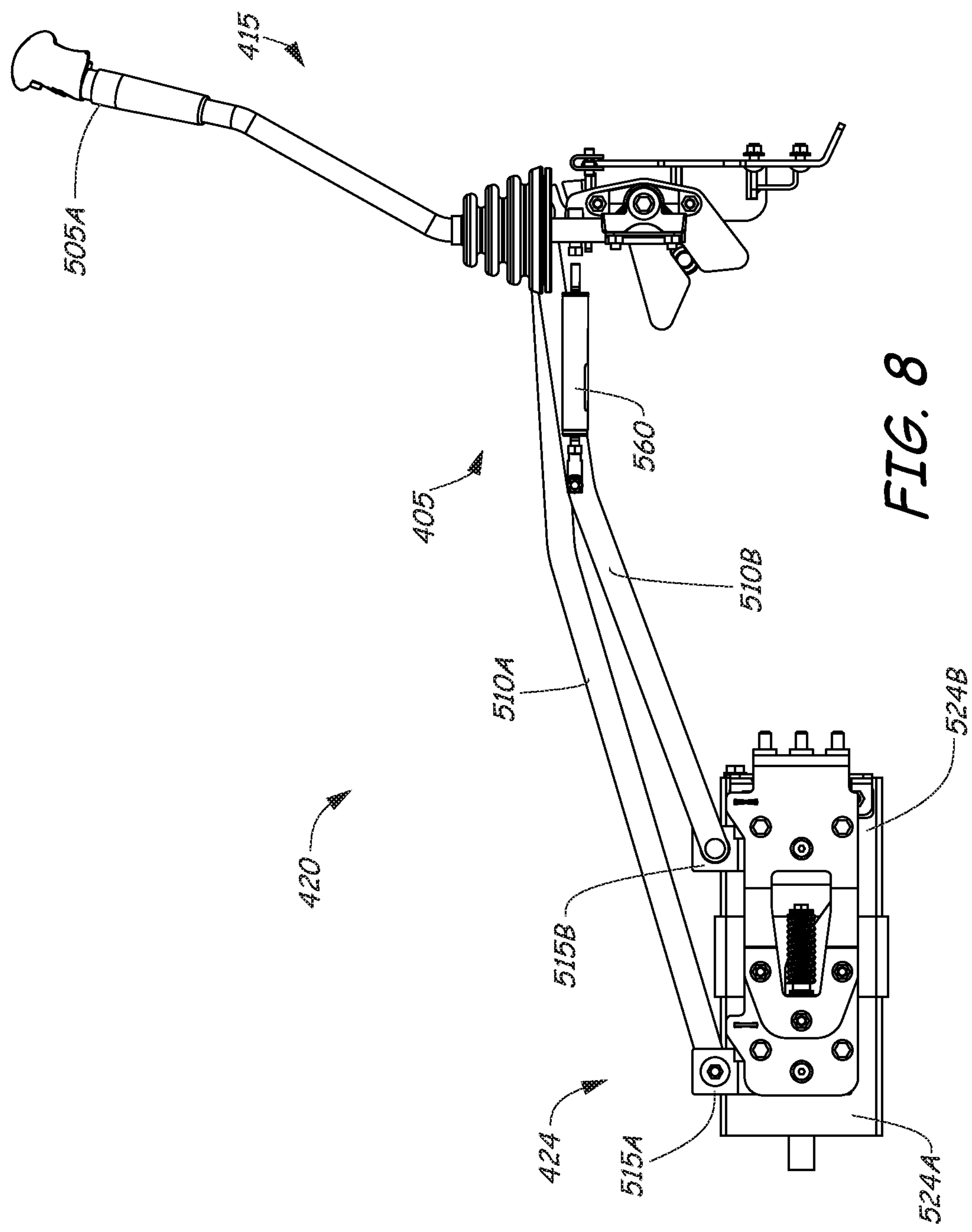
FIG. 8 is a side view of the pump assembly, pump controls and centering mechanisms, and corresponding mechanical controls shown in FIGS. 5-6.

Pump controls 410 include pintle arms 515A and 515B for separately controlling pumps 524A and 524B, responsive to operator movement of levers 505A and 505B, respectively. Each pintle arm is connected to the corresponding lever 505A or 505B by the respective control link 510A and 510B and other mechanisms discussed below. Because the pump controls 410 are positioned on the side of pump assembly 424, with pintle arms 515A and 515B positioned substantially in-line from back to front, left hand control link 510A is attached or coupled to a back or pump side of pintle arm 515A, while right hand control link 510B is attached or coupled to a front or non-pump side of pintle arm 515B. Having each of control links 510A and 510B connect to different sides of their respective pintle arms 515A and 515B creates lateral offset between the control links 510A and 510B, thereby allowing control of the pump assembly 424 with pump controls 410 positioned on the side of the assembly. This lateral offset between control links 510A and 510B is best shown in FIG. 7.

Figure 5:
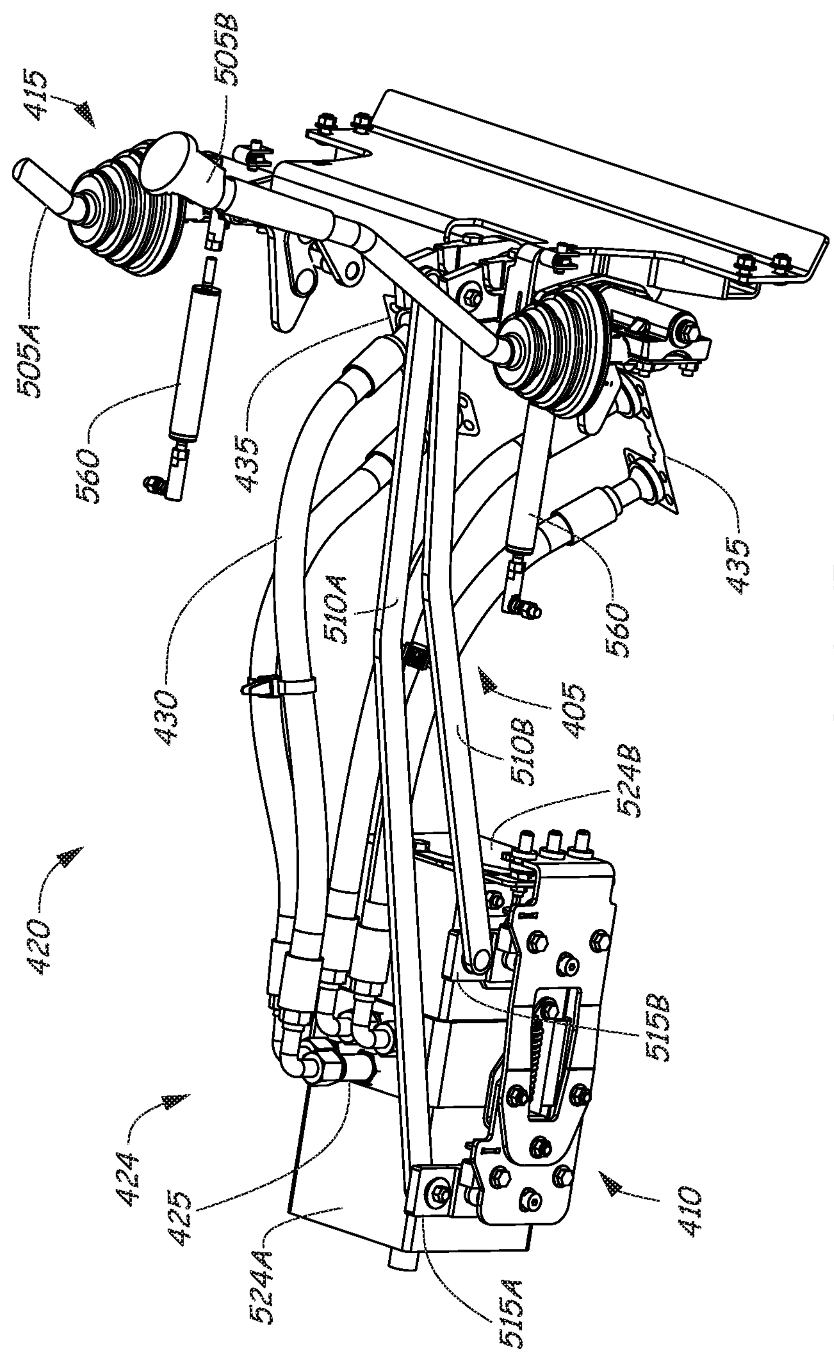
FIGS. 5-6 are perspective views of a pump assembly, pump controls and centering mechanisms, and corresponding mechanical controls in accordance with an exemplary embodiment.
Figure 6:
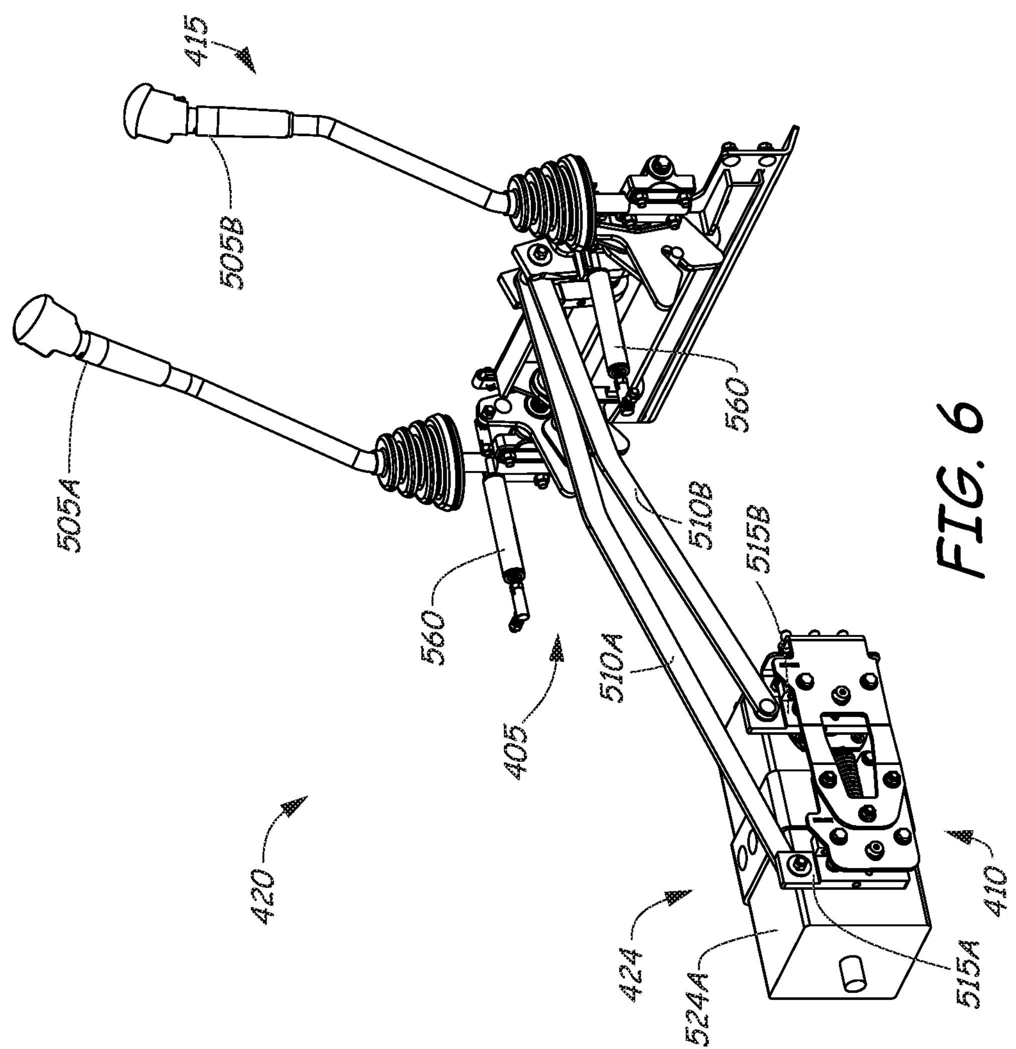

Also, shown in FIGS. 5-8 are features included in some embodiments, but not required to practice disclosed concepts. For example, one or more dampeners 560 are coupled to the mechanical controls 415 and the frame of the power machine (connection not shown) to reduce vibration feedback to the control levers 505A and 505B. Also, shown in FIG. 5 are hydraulic hoses or conduits 430 coupled to hydraulic connectors 425 on the top of the pump assembly 424. The hydraulic hoses or conduits 430 provide fluid connection to the hydraulic motors 435, only parts of which are represented in FIG. 5.

Figure 9:
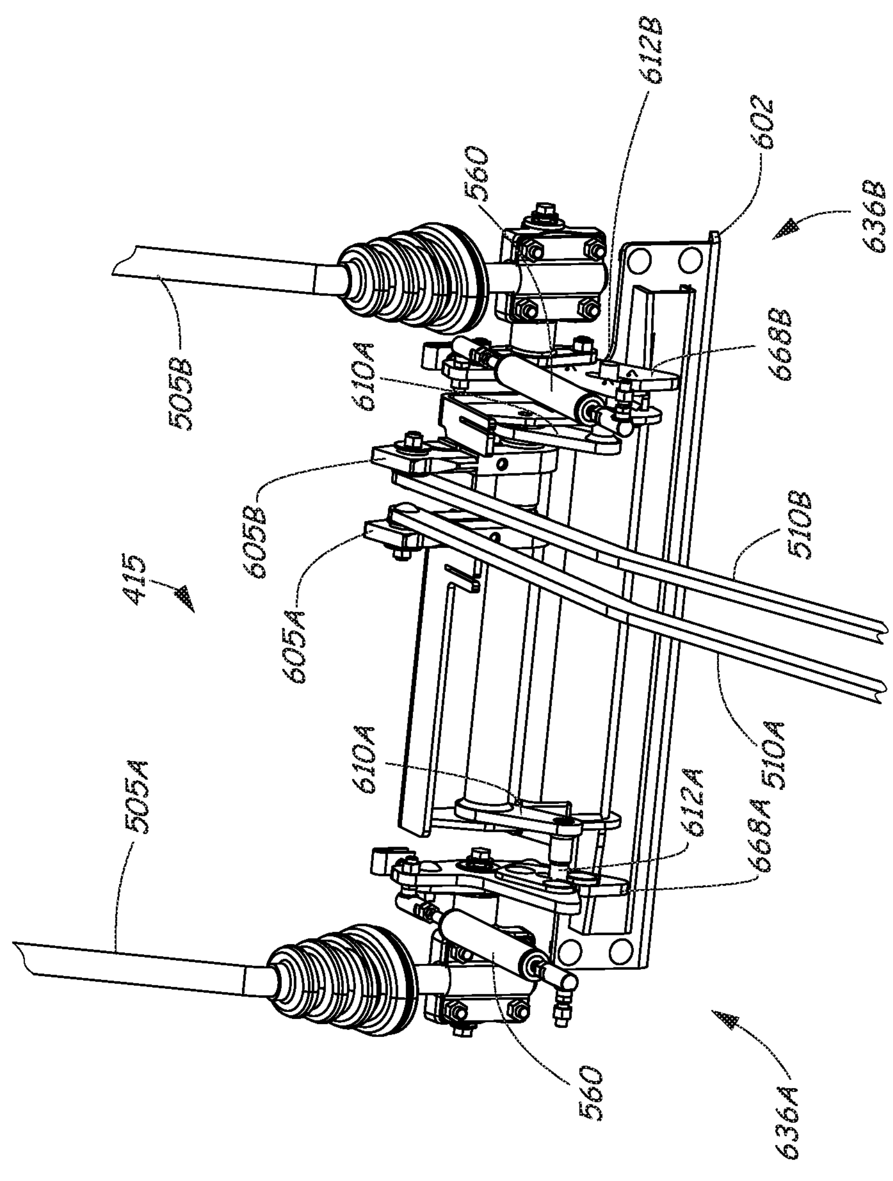
FIG. 9 is a perspective view of the mechanical controls shown in FIGS. 5-6.
Figure 10:
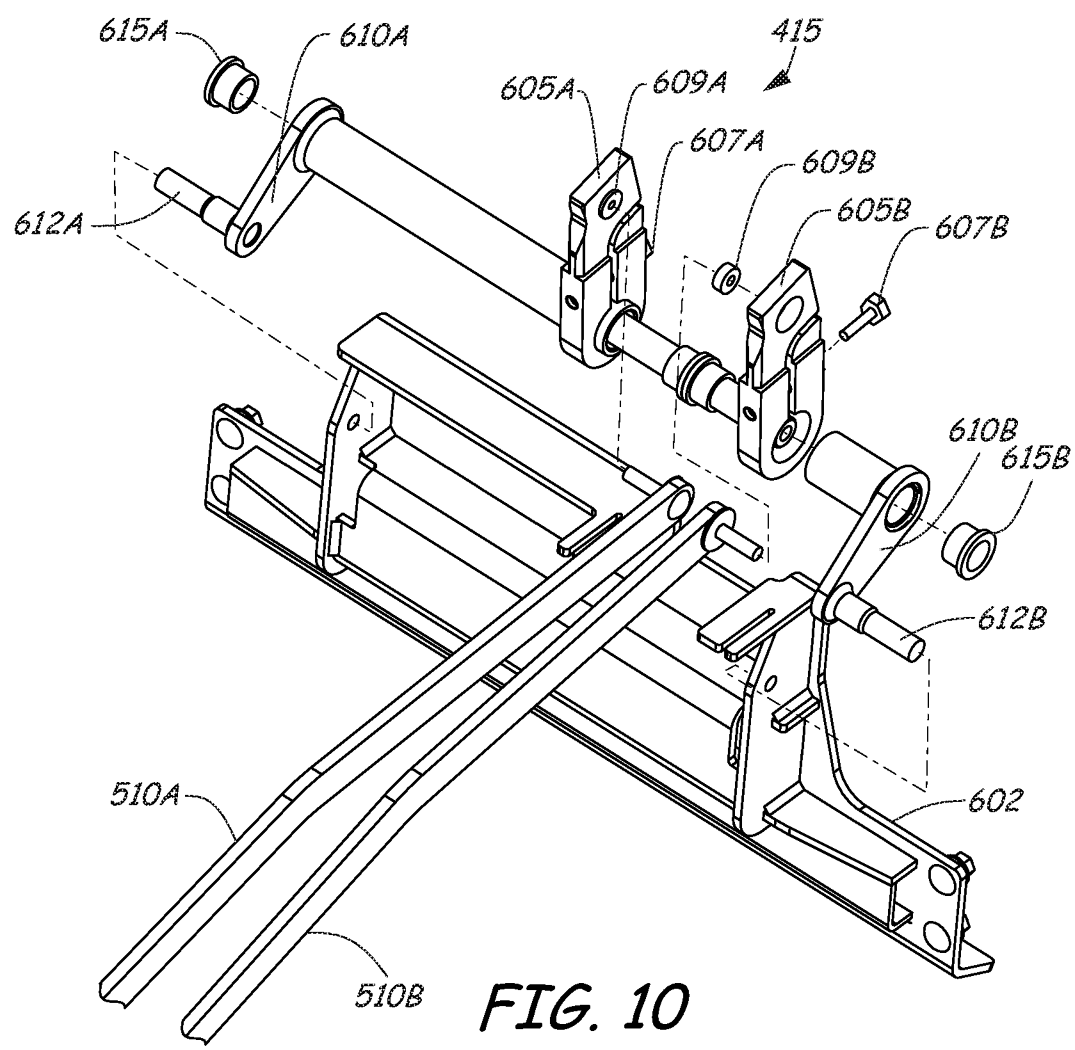
FIG. 10 is a partially exploded perspective view of the mechanical controls shown in FIGS. 5-6.

Referring now to FIGS. 9 and 10, shown are components of mechanical controls 415 in greater detail. Adjustment arms 605A and 605B are rotatably coupled to the respective control links 510A and 510B using torsion bushings 609A and 609B such that movement of levers 505A and 505B causes corresponding translated movement of control links 510A and 510B. The adjustment arms 605A and 605B have adjusting cross bolts 607A and 607B to allow calibration of particular positions of levers 505A and 505B to desired pump outputs. Adjustment arms 605A and 605B couple or connect the respective control links 510A and 510B to left hand steering bellcrank 610A and right hand steering bellcrank 610B. Bushings 615A and 615B allow rotation of the respective steering bellcranks 610A and 610B relative to panel 602 responsive to operator movement of levers 505A and 505B.

Releasable junctions 636A and 636B include engagement members 668A and 668B which are configured to releasably engage engagement pins 612A and 612B of the left hand steering bellcrank 610A and the right hand steering bellcrank 610B. In exemplary embodiments, engagement members 668A and 668B can include a pair of spaced apart fingers or members forming a slot therebetween as shown in FIG. 9. Junctions 636A and 636B are thereby used to translate movement of levers 505A and 505B, to the corresponding control links 510A and 510B, through bellcranks 610A and 610B and adjustment arms 605A and 605B. Exemplary releasable junction configurations, which allow the mechanical controls in an operator cab to be disconnected from the control links to the hydraulic pumps of a power machine when an operator compartment is pivotally raised with respect to the frame, are described in U.S. patent application Ser. No. 15/424,415 filed on Feb. 3, 2017 and entitled MECHANICAL CONTROL LINKAGE, which is hereby incorporated by reference in its entirety.

Although the present invention has been described with reference to preferred embodiments, workers skilled in the art will recognize that changes may be made in form and detail without departing from the scope of the discussion.

What is claimed is:

1. A power machine comprising:

a frame;

a cab pivotally mounted to the frame such that the cab can be pivoted relative to the frame; and a power conversion system, the power conversion system comprising:

a hydraulic pump assembly coupled to the frame;

first and second mechanical control linkages coupled to the hydraulic pump assembly;

mechanical controls mounted in the cab and configured to pivot with the cab relative to the frame, the mechanical controls including first and second control levers; and releasable junctions between the mechanical controls mounted in the cab and the first and second mechanical control linkages, the releasable junctions configured to translate movement of the first and second control levers, respectively, to the first and second mechanical control linkages when the cab is in a lowered position relative to the frame, wherein the releasable junctions are configured to break a connection between the mechanical controls mounted in the cab and the first and second mechanical control linkages when the cab is pivoted to a position away from the lowered position;

a first adjustment arm pivotally coupled to the first mechanical control linkage and operably coupled to a first steering bellcrank to translate motion of the first control lever to the first mechanical control linkage;

a second adjustment arm pivotally coupled to the second mechanical control linkage and operably coupled to a second steering bellcrank to translate motion of the second control lever to the second mechanical control linkage;

wherein the first and second adjustment arms include adjusting cross-bolts to calibrate particular positions of the first and second control levers to desired hydraulic pump assembly outputs.

2. A power machine comprising:

a frame;

a cab pivotally mounted to the frame such that the cab can be pivoted relative to the frame; and a power conversion system, the power conversion system comprising:

a hydraulic pump assembly having a first hydraulic pump and a second hydraulic pump, the hydraulic pump assembly coupled to the frame;

first and second fixed length mechanical control linkages pivotally coupled to the first hydraulic pump and the second hydraulic pump, respectively;

mechanical controls mounted in the cab and configured to pivot with the cab relative to the frame, the mechanical controls including first and second control levers; and releasable junctions between the mechanical controls mounted in the cab and the first and second fixed length mechanical control linkages, the releasable junctions configured to translate independent movement of the first and second control levers, respectively, to the first and second fixed length mechanical control linkages when the cab is in a lowered position relative to the frame, wherein the releasable junctions are configured to break a connection between the mechanical controls mounted in the cab and the first and second fixed length mechanical control linkages when the cab is pivoted to a position away from the lowered position;

a first adjustment arm pivotally coupled to the first fixed length mechanical control linkage using a first torsion bushing to translate motion of the first control lever to the first fixed length mechanical control linkage;

a second adjustment arm pivotally coupled to the second fixed length mechanical control linkage using a second torsion bushing to translate motion of the second control lever to the fixed length second mechanical control linkage;

wherein the first and second adjustment arms include adjusting mechanisms to calibrate particular positions of the first and second control levers to desired hydraulic pump assembly outputs.

3. The power machine of claim 2, wherein the releasable junctions are configured to make and break the connection between the mechanical controls mounted in the cab and the first and second fixed length mechanical control linkages, respectively when the cab is pivoted to the lowered position and pivoted away from the lowered position.

4. The power machine of claim 3, wherein the releasable junctions are configured to make and break the connection between the mechanical controls mounted in the cab and the first and second fixed length mechanical control linkages without a tool as the cab is pivoted to the lowered position and pivoted away from the lowered position.

5. The power machine of claim 3, wherein the releasable junctions comprise:

a first steering bellcrank having a first engagement pin;

a second steering bellcrank having a second engagement pin;

a first engagement member configured to releasably engage the first engagement pin; and a second engagement member configured to releasably engage the second engagement pin.

6. The power machine of claim 5, wherein the first and second engagement members are configured to move with the cab when the cab is pivoted away from the lowered position.

7. The power machine of claim 2, wherein the hydraulic pump assembly comprises:

the first and the second hydraulic pumps positioned in-line with each other and configured for use in powering left and right drive motors of the power machine, the hydraulic pump assembly having a top surface and a first side surface;

pump controls positioned on the pump assembly and configured to separately control, for each of the first and second hydraulic pumps, an amount and direction of hydraulic fluid flow from the first and second hydraulic pumps, wherein the pump controls further comprise:

a first pintle arm positioned on the first side surface of the hydraulic pump assembly and coupled to the first fixed length mechanical control linkage, the first pintle arm configured to control the amount and direction of hydraulic fluid flow from the first hydraulic pump; and a second pintle arm positioned on the first side surface of the hydraulic pump assembly and coupled to the second fixed length mechanical control linkage, the second pintle arm configured to control the amount and direction of hydraulic fluid flow from the second hydraulic pump.

8. The power machine of claim 7, and further comprising fluid couplers positioned on the top surface and configured to couple the first and second hydraulic pumps to hydraulic conduits to carry hydraulic fluid to or from the hydraulic pump assembly.

9. The power machine of claim 7, and further comprising a centering mechanism positioned on the first side surface of the hydraulic pump assembly and configured to bias both of the first and second pintle arms to center positions.

* * * * *